(12) United States Patent
Cray et al.

(10) Patent No.: US 7,906,605 B2
(45) Date of Patent: Mar. 15, 2011

(54) RELEASE COATING COMPOSITIONS HAVING IMPROVED RELEASE FORCE PROFILES

(75) Inventors: Stephen Edward Cray, Sully (GB); David A. Rich, Barry (GB); Jean De La Croix Habimana, Morlanwelz (BE); Paul Cornelius Vandort, Sanford, MI (US)

(73) Assignee: Dow Corning Corporation, Midland, MI (US)

( * ) Notice: Subject to any disclaimer, the term of this patent is extended or adjusted under 35 U.S.C. 154(b) by 397 days.

(21) Appl. No.: 11/989,514

(22) PCT Filed: Jul. 19, 2006

(86) PCT No.: PCT/US2006/028205
§ 371 (c)(1),
(2), (4) Date: Jan. 25, 2008

(87) PCT Pub. No.: WO2007/015944
PCT Pub. Date: Feb. 8, 2007

(65) Prior Publication Data
US 2010/0144960 A1    Jun. 10, 2010

Related U.S. Application Data

(60) Provisional application No. 60/703,233, filed on Jul. 28, 2005.

(51) Int. Cl.
C08G 77/12    (2006.01)
(52) U.S. Cl. ............................. 528/31; 528/37; 528/32
(58) Field of Classification Search .................. 528/37, 528/31, 32
See application file for complete search history.

(56) References Cited

U.S. PATENT DOCUMENTS

| | | |
|---|---|---|
| 2,868,766 A | 1/1959 | Johannson |
| 2,994,684 A | 8/1961 | Johannson |
| 3,002,951 A | 10/1961 | Johannson |
| 3,159,601 A | 12/1964 | Ashby |
| 3,159,662 A | 12/1964 | Ashby |
| 3,220,972 A | 11/1965 | Lamoreaux |
| 3,296,291 A | 1/1967 | Chalk et al. |
| 3,372,178 A | 3/1968 | Wu |
| 3,410,886 A | 11/1968 | Roy |
| 3,419,593 A | 12/1968 | Willing |
| 3,516,946 A | 6/1970 | Modic |
| 3,814,730 A | 6/1974 | Karstedt |
| 3,928,629 A | 12/1975 | Chandra et al. |
| 3,989,668 A | 11/1976 | Lee et al. |
| 3,996,195 A | 12/1976 | Sato et al. |
| 4,245,079 A | 1/1981 | Matsumoto et al. |
| 4,427,801 A | 1/1984 | Sweet |
| 4,461,867 A | 7/1984 | Surprenant |
| 4,525,400 A | 6/1985 | Surprenant |
| 4,525,566 A | 6/1985 | Homan et al. |
| 4,616,076 A | 10/1986 | Ona et al. |
| 4,681,963 A | 7/1987 | Lewis |
| 4,689,384 A | 8/1987 | Kondow et al. |
| 4,705,765 A | 11/1987 | Lewis |
| 4,726,964 A | 2/1988 | Isobe et al. |
| 4,849,491 A | 7/1989 | Ogawa et al. |
| 4,900,779 A | 2/1990 | Leibfried |
| 4,902,731 A | 2/1990 | Leibfried |
| 5,036,117 A | 7/1991 | Chung et al. |
| 5,057,476 A | 10/1991 | Saruyama et al. |
| 5,097,054 A | 3/1992 | Yamamoto et al. |
| 5,162,445 A | 11/1992 | Powers et al. |
| 5,175,325 A | 12/1992 | Brown et al. |
| 5,200,543 A | 4/1993 | Inomata et al. |
| 5,290,841 A | 3/1994 | Enami et al. |
| 5,344,906 A | 9/1994 | Westall |
| 5,378,790 A | 1/1995 | Michalczyk et al. |
| 5,412,055 A | 5/1995 | Loo |
| 5,426,167 A | 6/1995 | Powers et al. |
| 5,436,308 A | 7/1995 | Durfee et al. |
| 5,525,696 A | 6/1996 | Herzig et al. |
| 5,536,803 A | 7/1996 | Fujiki et al. |
| 5,545,831 A | 8/1996 | Kaiya et al. |
| 5,548,051 A | 8/1996 | Michalczyk et al. |
| 5,575,831 A | 11/1996 | Yamamura et al. |
| 5,581,008 A | 12/1996 | Kobayashi |
| 5,656,711 A | 8/1997 | Fukuda et al. |
| 5,670,596 A | 9/1997 | Razzano et al. |
| 5,691,435 A | 11/1997 | Herzig et al. |
| 5,830,969 A | 11/1998 | Ahmed Jallouli et al. |
| 5,883,215 A | 3/1999 | Bischoff et al. |
| 5,985,462 A | 11/1999 | Herzig et al. |
| 6,005,051 A | 12/1999 | Kennedy et al. |
| 6,093,782 A | 7/2000 | Herzig et al. |
| 6,127,502 A | 10/2000 | Krahnke et al. |
| 6,160,150 A | 12/2000 | Krahnke et al. |

(Continued)

FOREIGN PATENT DOCUMENTS

| | | |
|---|---|---|
| EP | 0259711 | 3/1988 |
| EP | 0 108 208 | 4/1988 |
| EP | 0416471 | 3/1991 |
| EP | 0464706 | 1/1992 |
| EP | 0600512 | 6/1994 |

(Continued)

Primary Examiner — Kuo-Liang Peng
(74) Attorney, Agent, or Firm — Alan Zombeck

(57) ABSTRACT

A composition containing (A) a compound having at least one aliphatic unsaturation; (B) a cyclic organohydrogen-silicon crosslinking compound containing at least one silicon-bonded hydrogen atom (Sift) per molecule, prepared by a platinum catalyzed coupling reaction of a methylhydrogen cyclosiloxane, with a reactant containing aliphatic unsaturation, hydroxy functionalities, or a mixture of both; and (B1) a linear or branched acyclic organohydrogensilicon Crosslinking compound containing at least one silicon-bonded hydrogen atom per molecule. The composition can be used to prepare release coating compositions by adding (C) a platinum group metal-containing catalyst. Release coating compositions containing Components (B) and (B1) have better cure, better adhesion, and lower release forces, than release coating compositions containing only Component (B).

7 Claims, No Drawings

U.S. PATENT DOCUMENTS

| | | |
|---|---|---|
| 6,177,519 B1 | 1/2001 | Chung et al. |
| 6,184,407 B1 | 2/2001 | Yoshitake et al. |
| 6,235,832 B1 | 5/2001 | Deng et al. |
| 6,252,100 B1 | 6/2001 | Herzig |
| 6,300,452 B1 | 10/2001 | Jukarainen et al. |
| 6,303,729 B1 | 10/2001 | Sato |
| 6,313,255 B1 | 11/2001 | Rubinsztajn |
| 6,353,075 B1 | 3/2002 | Hupfield et al. |
| 6,528,584 B2 | 3/2003 | Kennedy et al. |
| 6,562,469 B2 | 5/2003 | Koyama et al. |
| 6,605,734 B2 | 8/2003 | Roy et al. |
| 6,797,772 B2 | 9/2004 | Nakayoshi et al. |
| 2005/0256286 A1 | 11/2005 | Asch et al. |
| 2006/0074212 A1 | 4/2006 | Chapman et al. |
| 2006/0111491 A1 | 5/2006 | Asch et al. |
| 2006/0116500 A1 | 6/2006 | Chapman et al. |
| 2006/0189767 A1 | 8/2006 | Bhagwagar et al. |

FOREIGN PATENT DOCUMENTS

| | | |
|---|---|---|
| EP | 0860459 | 8/1998 |
| EP | 0979837 | 2/2000 |
| EP | 1070734 | 1/2001 |
| EP | 1221468 | 7/2002 |
| JP | 61/162561 | 7/1986 |
| JP | 62/241964 | 10/1987 |
| WO | WO 03/093349 | 11/2003 |
| WO | WO 03/093369 | 11/2003 |
| WO | WO 2004/058857 | 7/2004 |
| WO | WO 2004/058858 | 7/2004 |
| WO | WO 2005/005544 | 1/2005 |

RELEASE COATING COMPOSITIONS HAVING IMPROVED RELEASE FORCE PROFILES

CROSS REFERENCE TO RELATED APPLICATIONS

This application is a U.S. national stage filing under 35 U.S.C. §371 of PCT Application No. PCT/US2006/028205 filed on Jul. 9, 2006, currently pending, which claims the benefit of U.S. Provisional Patent Application No. 60/703,233 filed Jul. 28, 2005 under 35 U.S.C. §119 (e). PCT Application No. PCT/US2006/028205 and U.S. Provisional Patent Application No. 60/703,233 are hereby incorporated by reference.

FIELD OF THE INVENTION

This invention is directed to a coating composition comprising Component (A) a compound having at least one aliphatic unsaturation; Component (B) a cyclic organohydrogensilicon crosslinking compound containing at least one silicon-bonded hydrogen atom per molecule; Component (B1) a linear or branched acyclic organohydrogensilicon crosslinking compound containing at least one silicon-bonded hydrogen atom per molecule; and Component (C) a platinum group metal-containing catalyst. Other optional components may also be included. Release coating compositions containing blends (B') of Component (B) and Component (B1) provide improved release coating compositions that have a better combination of cure, adhesion, and lower release forces, than release coating compositions containing only Component (B) or only Component (B1).

BACKGROUND OF THE INVENTION

Silicone release coatings are useful in applications where relatively non-adhesive surfaces are required. Single sided liners, such as backing papers for pressure sensitive adhesive labels, are usually adapted to temporarily retain the labels without affecting the adhesive properties of the labels. Double sided liners, such as interleaving papers for double sided and transfer tapes, are utilized to ensure the protection and desired unwind characteristics of a double sided self-adhesive tape or adhesive film.

Substrates such as single sided liners are coated by applying silicone release coating compositions onto the substrate, and subsequently curing the composition by thermally initiated hydrosilylation.

The basic constituents of silicone release coating compositions which are cured by hydrosilylation are:
  (i) an alkenylated polydiorganosiloxane which can be a linear polymer or a branched polymer containing terminal and/or pendant alkenyl groups, most typically a linear polymer containing terminal alkenyl groups,
  (ii) a polyorganohydrogensiloxane cross-linking agent designed to cross-link the alkenylated polydiorganosiloxane, and
  (iii) a catalyst to catalyze the cross-linking reaction.

Often a fourth constituent comprising an inhibitor (iv) is also included in the composition which is designed to prevent the commencement of curing below a prerequisite cure temperature. Silicone release coating compositions consisting of the three essential constituents (i)-(iii) and optionally the inhibitor (iv), are generally referred to as premium silicone release coating compositions.

In order to control the level of release force from such silicone release coatings, it has become common practice in the art for silicone release coating compositions to contain another additive known as a release modifier. The release modifier typically replaces a proportion of the alkenylated polydiorganosiloxane (i) in premium silicone release coating compositions.

Improvements in the performance of silicone release coatings are continuously being sought with respect to properties such as ease of cure, i.e. the decrease in cure times at relatively low temperatures, anchorage of coatings to substrates, and release performance. One factor which particularly necessitates continued development of such silicone release coatings is the use of an ever increasing number of substrates such as paper, polycoated kraft paper, polypropylene, polyethylene, and polyester, onto which such silicone release coating compositions are applied and cured.

BRIEF SUMMARY OF THE INVENTION

This invention relates to a composition comprising (A) a compound having at least one aliphatic unsaturation; (B) a cyclic organohydrogensilicon crosslinking compound containing at least one silicon-bonded hydrogen atom (SiH) per molecule, prepared by a platinum catalyzed coupling reaction of a methylhydrogen cyclosiloxane, with a reactant containing aliphatic unsaturation, hydroxy functionalities, or a mixture of both; and (B1) a linear or branched acyclic organohydrogensilicon crosslinking compound containing at least one silicon-bonded hydrogen atom per molecule.

The invention also relates to a release coating composition comprising (A) a compound having at least one aliphatic unsaturation; (B) a cyclic organohydrogensilicon crosslinking compound containing at least one silicon-bonded hydrogen atom (SiH) per molecule, prepared by a platinum catalyzed coupling reaction of a methylhydrogen cyclosiloxane, with a reactant containing aliphatic unsaturation, hydroxy functionalities, or a mixture of both; (B1) a linear or branched acyclic organohydrogensilicon crosslinking compound containing at least one silicon-bonded hydrogen atom per molecule; and (C) a platinum group metal-containing catalyst. These and other features of the invention will become apparent from a consideration of the detailed description.

DETAILED DESCRIPTION OF THE INVENTION

The essential components of the release coating composition of the invention are Component (A) a compound having at least one aliphatic unsaturation; Component (B) a cyclic organohydrogensilicon crosslinking compound containing at least one silicon-bonded hydrogen atom per molecule; Component (B1) a linear or branched acyclic organohydrogensilicon crosslinking compound containing at least one silicon-bonded hydrogen atom per molecule; and Component (C) a platinum group metal-containing catalyst.

Component (A)—The Compound having Aliphatic Unsaturation

An exhaustive list and description of appropriate compounds having aliphatic unsaturation useful as Component (A) in this invention, is contained in WO 03/093369, herein incorporated by reference for its teaching of compounds having aliphatic unsaturation. As noted in WO 03/093369, these compounds having aliphatic unsaturation can include for example, mono-olefins, diolefins, cyclo-olefins, mono-alkynes, oxygen-containing aliphatically unsaturated compounds, heterocyclic compounds containing aliphatic unsaturation in the ring, halogenated derivatives of aliphatically unsaturated compounds, unsaturated compounds containing nitrogen substituents, polymers derived from olefinic monomers and dienes, polymers of mono-olefins, isomono-olefins, and vinyl aromatic monomers, polydienes, halogenated olefin polymers having aliphatic unsaturation, and polymers containing vinyl ether groups, acrylate groups, methacrylate groups, and epoxy-functional groups.

Typically compounds containing the silicon atom, i.e., organosilicon compounds and silicon modified organic compounds. The aliphatically unsaturated organosilicon compounds can consist of silanes, silane-modified organic polymers, polysilanes, siloxanes, silazanes, monomeric and polymeric materials containing silicon atoms joined together by hydrocarbyl groups such as alkylene, polyalkylene, or arylene groups.

Examples of organosilicon polymers and silicon-modified organic polymers especially useful herein include trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, vinyldimethylsiloxy terminated poly(dimethylsiloxane-monomethylsilsesquioxane) polymers, vinyldimethylsiloxy terminated poly(dimethylsiloxane-vinylmethylsiloxane-methylsilsesquioxane) copolymers; trimethylsiloxy terminated poly(dimethylsiloxane-vinylmethylsiloxane-methylsilsesquioxane)polymers, hexenyldimethylsiloxy terminated poly(dimethylsiloxane-monomethylsilsesquioxane)polymers, hexenyldimethylsiloxy terminated poly(dimethylsiloxane-hexenylmethylsiloxane-methylsilsesquioxane)copolymers; trimethylsiloxy terminated poly(dimethylsiloxane-hexenylmethylsiloxane-methylsilsesquioxane)polymers, partially and fully vinyldimethylsiloxy terminated poly(dimethylsiloxane-silicate)copolymers, hexenyldimethylsiloxy-terminated poly(dimethylsiloxane-silicate)copolymers, trimethylsiloxy terminated poly(dimethylsiloxane-vinylmethylsiloxane-silicate) copolymers and trimethylsiloxy terminated poly(dimethylsiloxane-hexenylmethylsiloxane-silicate) copolymers, vinylsiloxy or hexenylsiloxy terminated poly(dimethylsiloxane-hydrocarbyl copolymers), vinylsiloxy terminated or hexenylsiloxy terminated poly(dimethylsiloxane-polyoxyalkylene) block copolymers, alkenyloxydimethylsiloxy terminated polyisobutylene and alkenyloxydimethylsiloxy terminated polydimethylsiloxane-polyisobutylene block copolymers.

Further examples of Component (A) compounds include hexenyldimethylsiloxy-terminated polydimethylsiloxane-polymethylhexenylsiloxane copolymers, hexenyldimethylsiloxy-terminated polydimethylsiloxane polymers, vinyldimethylsiloxy-terminated polydimethylsiloxane polymers, partially or fully vinylated or hexenylated dimethylsiloxy-terminated poly(dimethylsiloxane-silicate)copolymers, and vinyl or hexenyldimethylsiloxy terminated poly(dimethylsiloxane-hydrocarbyl)copolymers, having a degree of polymerization (DP) of from 25-500, and a viscosity at 25° C. of from 50-3,000 millipascal-seconds (mPa·s).

Component (A) is typically a compound selected from hexenyldimethylsiloxy-terminated polydimethylsiloxane-polymethylhexenylsiloxane copolymers, vinyldimethylsiloxy-terminated polydimethylsiloxane polymers, and partially or fully vinylated dimethylsiloxy-terminated poly(dimethylsiloxane-silicate) copolymers, each having a DP of from 50-300 and a viscosity at 25° C. of from 80-1,000 mPa·s. Generally, 1-99 parts by weight of component (A), based on the total weight percent of solids is used in the release coating composition, alternatively 15-99 parts by weight of component (A).

Component (B)—The Cyclic Organohydrogensilicon Crosslinking Compound

Component (B) is a cyclic organohydrogensilicon compound made by a platinum catalyzed coupling reaction of a methylhydrogen cyclosiloxane, with a reactant containing aliphatic unsaturation, hydroxy functionalities, or a mixture of both. These compounds and the method making the compounds are described in detail in International Published Application WO 03/093349 (Nov. 13, 2003), hereafter referred to as WO 03/093349, herein incorporated by reference for its teaching of cyclic organohydrogensilicon crosslinking compounds.

Once an initial organohydrogensilicon compound is prepared, subsequent hydrosilylations or condensations may also be done to replace or convert some of the SiH bonds to other types of groups. Thus, the method can further comprise adding at least one hydrocarbon, oxyhydrocarbon or functional compound having at least one aliphatic unsaturation or hydroxy group, to the reaction mixture comprising the organohydrogensilicon compound having at least one SiH bond per molecule. A second reaction mixture is formed comprising organohydrogensilicon compounds having at least one SiH bond per molecule, where a certain percentage of SiH groups have been converted to hydrocarbon, oxyhydrocarbon or functional groups. When these subsequent reactions are utilized, typically 5-70 percent of the SiH groups are replaced, or converted to hydrocarbon, oxyhydrocarbon, or functional groups, alternatively 5-50 percent, alternatively 10-30 percent.

Examples of the hydrocarbon, oxyhydrocarbon and functional compounds having at least one aliphatic unsaturation or hydroxy group useful for these subsequent reactions, include compounds which contain either a aliphatic unsaturation or hydroxy group. Typical compounds include functional compounds such as allylglycidyl ether; vinylcyclohexylepoxide; hydrocarbon compounds such as alkenes including 1-hexene, 1-octene, and vinylcyclohexene; and dienes such as 1,5-hexadiene; and compounds containing oxyhydrocarbon groups such as alkenyloxy groups including oxybutylvinylether, and alkynyloxy groups such as propargyloxy and hexynyloxy. One example of compounds useful as Component (B) is shown below, where 10 percent of the SiH groups has been replaced with propylglycidylether groups; and where x is 1-5, and d is about 8.

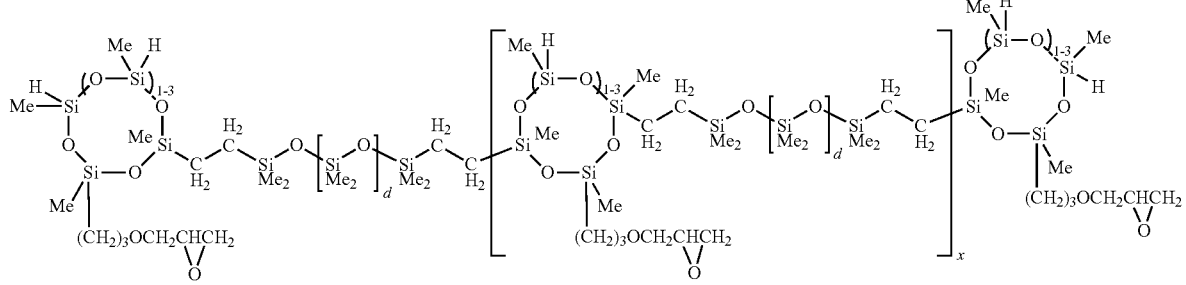

Component (B1)—The Linear or Branched Acyclic Organohydrogensilicon Crosslinking Compound (B1) is an ≡SiH containing hydrogensiloxane in which there is present in the molecule a sufficient number of groups that are hydrogen, to provide at least 0.10 percent by weight of hydrogen as hydrogen. Such organohydrogensilicon compounds can include for example, linear or branched acyclic polymers and copolymers such as polyalkylhydrogensiloxane fluids, and polydialkyl(alkylhydrogen)siloxane copolymers. Particularly useful as Component (B1) for the present invention are hydrogen endblocked polydimethylsiloxanes, trimethylsiloxy endblocked methylhydrogen(dimethyl)polysiloxane copolymers, hydrogen endblocked methylhydrogen(dimethyl)polysiloxane copolymers, and trimethylsiloxy endblocked methylhydrogenpolysiloxanes. Especially useful are trimethylsiloxy endblocked polymethylhydrogensiloxanes or trimethylsiloxy endblocked methylhydrogen(dimethyl)polysiloxane copolymers, containing 10-100 percent ≡SiH groups, and having a viscosity of 5-1,000 mm$^2$/s (centistoke) at 25° C. These compositions are known in the art, and are available commercially from suppliers such the Dow Corning Corporation, Midland, Mich., assignee of the present application.

Component (C)—The Platinum Group Metal-Containing Catalyst

Component (C) can be any catalyst typically employed for hydrosilylation reactions. Typically used are platinum group metal-containing catalysts. By platinum group it is meant ruthenium, rhodium, palladium, osmium, iridium and platinum and complexes thereof. The platinum-containing catalyst can be platinum metal, platinum metal deposited on a carrier such as silica gel, or powdered charcoal, or a compound or complex of a platinum group metal. Platinum-containing catalysts include chloroplatinic acid, either in hexahydrate form or in the anhydrous form, and or a platinum-containing catalyst which is obtained by a method comprising reacting chloroplatinic acid with an aliphatically unsaturated organosilicon compound such as divinyltetramethyldisiloxane, or an alkene-platinum-silyl complex such as (COD)Pt(SiMeCl$_2$)$_2$, where COD is 1,5-cyclooctadiene and Me is methyl.

The appropriate amount of the catalyst will depend upon the particular catalyst used. The platinum catalyst should be present in an amount sufficient to provide at least 2 parts per million (ppm), alternatively 5-200 ppm of platinum, based on total weight percent of solids in the release coating composition, alternatively 5-150 weight ppm of platinum.

Component (D)—The Inhibitor

The release coating compositions of the present invention may also comprise an inhibitor (D). Optional component (D) can be any material that is known to be, or can be, used to inhibit the catalytic activity of platinum group metal-containing catalysts. As used herein, the term inhibitor means a material that retards the activity of a catalyst at room temperature, but does not interfere with the properties of the catalyst at elevated temperatures. Examples of suitable inhibitors include ethylenically or aromatically unsaturated amides, acetylenic compounds, silylated acetylenic compounds, ethylenically unsaturated isocyanates, olefinic siloxanes, unsaturated hydrocarbon monoesters and diesters, conjugated ene-ynes, hydroperoxides, nitriles, and diaziridines.

Typical inhibitors include acetylenic alcohols exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, mono-ethyl fumarate, mono-allyl fumarate, and 2-methoxy-1-methylethylmaleate; conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, and a mixture of a conjugated ene-yne as described above and a vinylcyclosiloxane as described above. Typically the inhibitors are diallyl maleate, bis-2-methoxy-1-methylethylmaleate, 1-ethynyl-1-cyclohexanol, and 3,5-dimethyl-1-hexyn-3-ol. When used, typically from 0.03-10 parts by weight of inhibitor be used, based on the total weight percent of solids in the release coating composition, alternatively 0.03-2 parts by weight of inhibitor be used.

Component (E)—The Bath Life Extender

The release coating compositions of the present invention may also comprise a bath life extender (E). Optional component (E) can be added in a total amount sufficient to further retard the curing reaction at room temperature. Examples of suitable bath life extenders include compounds which contain one or more primary or secondary alcohol groups, carboxylic acids including compounds which yield carboxylic acids when exposed to water at room temperature, cyclic ethers, and water. Included in this group are the primary and secondary alcohols; diols and triols such as ethylene glycol, propylene glycol and glycerine; partial ethers of diols and triols such as 2-methoxyethanol, 2-methoxypropanol, and 2-methoxyisopropanol; tetrahydrofuran; water and aqueous solutions of mineral acids, alkalis, and salts. Primary and secondary alcohols, having fewer than 10 carbon atoms, are typically used for the release coating compositions of this invention. Examples include methanol, 1-butanol, 2-butanol, tetradecanol, and other alkanols such as ethanol, normal- and isopropanol, iso-butanol, and the normal-, secondary-, and isopentanols, -hexanols, -heptanols, and -octanols; benzyl alcohol, phenol, and other aromatic alcohols such as methylphenyl carbinol, and 2-phenylethyl alcohol; allyl alcohol, and cyclohexanol.

When included in the present release coating composition, typically from 0.005-10 parts by weight of the bath life extender (E), based on the total weight percent of solids in the release coating composition be used. Alternatively, the amount of bath life extender to be used falls within the range of 0.005-5 parts on the same basis, alternatively 0.005-1 parts.

Component (F)—The Release Modifier

The release coating compositions of the present invention may also comprise a release modifier (F). Optional component (F) can be any of the known release modifiers in the art. Generally, the release modifier comprises a silicone resin, and may include at least one additional component selected from the following components: (i) an alkenylated polydiorganosiloxane, (ii) one or more primary alkenes containing from 14-30 carbon atoms, and (iii) one or more branched alkenes containing at least 10 carbon atoms.

The siloxane resin consists essentially of $R^2{}_3SiO_{1/2}$ units (also known as M units) and $SiO_{4/2}$ units (also known as Q units), where each $R^2$ is independently selected from hydrogen, a monovalent hydrocarbon group comprising 1-20 carbon atoms and being free of aliphatic unsaturation, or a monovalent hydrocarbon group comprising 2-20 carbon atoms having aliphatic unsaturation. Each $R^2$ is typically independently selected from a monovalent hydrocarbon group comprising 1-20 carbon atoms free of aliphatic unsaturation, or a monovalent hydrocarbon group comprising 2-20 carbon atoms having at least one aliphatic unsaturation. The molar ratio of $R^2{}_3SiO_{1/2}$ units to $SiO_{4/2}$ is from 0.6:1 to 4:1, alternatively from 0.6:1 to 1.9:1, alternatively from 0.7:1 to 1.6:1.

The alkenylated polydiorganosiloxanes (i) is typically a linear polymer with terminal alkenyl groups Each primary alkene (ii) used may be any primary alkene containing from 10-30 carbon atoms such as dodecene, tetradecene and octadecene. Each branched alkene (iii) used may be any one or more suitable branched alkenes, where the total number of carbons is at least 10, alternatively at least 20.

The release modifier generally comprises 5-85 weight percent, alternatively 25-85 weight percent of the siloxane resin, the remainder being one or more of the components (i), (ii), or (iii). Although optional, when used in a release coating composition, it is typical that 5-99 parts by weight of the release modifier be added, based on total weight percent solids in the release coating composition.

Other Components (G)

The release coating compositions of the present invention can further comprise other optional components commonly used in platinum group metal catalyzed organosilicon compositions, such as reinforcing and extending fillers, mist reducing additives, anchorage additives, hydrocarbon and halohydrocarbon solvents, colorants, stabilizers, and adhesive-release modifiers such as non-functional fluids or gums.

The release coating compositions of this invention may also contain 0.1-99 parts by weight of a solvent, alternatively from 70-90 parts by weight, based on the total weight percent of solids in the release coating composition. Examples of useful solvents include toluene, xylene, methylisobutylketone, isopropanol, and heptane. The release coating may also be applied as an emulsion where the solvent is typically water.

Preparation and Use

The release coating compositions of the present invention can be prepared by homogeneously mixing components (A), (B), (B1) and (C), and any optional components, in any order using any suitable mixing means such as a spatula, a drum roller, a mechanical stirrer, a three roll mill, a sigma blade mixer, a bread dough mixer, or a two roll mill. The present release coating compositions can be supplied in any desired package combination, including multi-component to single component packages. It is preferred that the platinum group metal-containing catalyst Component (C) be brought together in the presence of components (A), (B), (B1) and (D), and any other optional components.

The release coating can be prepared and cured by mixing at least one compound having at least two aliphatic unsaturation Component (A); at least one cyclic organohydrogensilicon crosslinking compound containing at least one silicon-bonded hydrogen atom per molecule Component (B); at least one linear or branched acyclic organohydrogensilicon crosslinking compound containing at least one silicon-bonded hydrogen atom per molecule Component (B1); and a platinum group metal-containing catalyst Component (C). Component (C) is present in an amount sufficient to catalyze the reaction. The mixture of Components (A)-(C) is then coated on the surface of a substrate. The coating and the substrate are exposed to an energy source such as heat or actinic radiation, in an amount sufficient to cure the release coating. A pressure sensitive adhesive can then be applied on the release coating after it has been cured.

By actinic radiation is meant ultraviolet light; electron beam radiation; and alpha-, beta-, gamma-, and x-rays. By heat is meant infrared radiation, hot air, or microwave radiation. Actinic radiation is frequently accompanied by heat, and so the use of a combination of the two sources can also be used herein. The coating process can be accomplished by any suitable manner such as spreading, brushing, extruding, spraying, gravure, kiss-roll, or air-knife.

The solid substrate is a flexible sheet material such as paper, polyolefin film, and polyolefin-coated paper or foil, generally a paper or film of liner stock such as glassine paper or super calendar kraft (SCK) paper. Other suitable solid substrates that can be coated include other cellulosic materials such as wood, cardboard and cotton; metallic materials such as aluminum, copper, steel and silver; siliceous materials such as glass and stone; and synthetic polymeric materials such as polyolefins, polyamides, polyesters, and polyacrylates. The solid substrate can be substantially sheet-like such as a peelable release liner for a pressure sensitive adhesive; a fabric or foil; or substantially three-dimensional in form. After the silicone release coating composition has been coated onto the substrate, it is heated and/or irradiated with actinic radiation, as noted above to cure the liquid release coating, and adhere it to the substrate.

A flexible sheet material such as paper, polyolefin film, and polyolefin-coated paper or foil, is coated with a thin coating of the silicone release coating composition, in a continuous manner, and the coated material is then heated, and/or irradiated, to rapidly cure the silicone release coating, to provide a sheet-like material bearing on at least one surface the release coating. The release coating is subsequently brought into contact with a pressure sensitive adhesive, in an in-line manner, to form an article having a peelable, releasable, adhesive/coating interface. Articles that can be prepared include adhesive labels having a peelable paper or film facestock backing, adhesive tape in roll form, and adhesives packaged in a strippable container. The pressure sensitive adhesive can be a non-silicon-based type such as acrylic or rubber, or a silicon-based type such as a peroxide- or platinum-curable polydiorganosiloxane-based adhesives. Adhesive materials other than pressure sensitive adhesives can be used such as graphite composites, asphalt, or gum polymers. In addition to being useful for making coatings, the silicone release coating compositions can also be used for making elastomers, adhesives, foams, and fluids.

EXAMPLES

The following examples are set forth in order to illustrate the invention in more detail. The materials used in the Examples and referred to in the Tables are as follows.

Component (A)—The Compound having Aliphatic Unsaturation (Silicon Containing)

The compounds and the method of making the compounds are described in detail in detail in copending U.S. Provisional Application Ser. No. 60/629,257, filed Nov. 18, 2004, and assigned to the same assignee as the present invention. The compounds used as Component (A) included:

(i) Polymer A—a vinyldimethylsilyl terminated polydimethylsiloxane polymer with a viscosity of 300 $mm^2/s$ (centistoke) at 25° C.

(ii) Polymer B—a vinyldimethylsilyl terminated poly(dimethylsiloxane-silicate)copolymer with a viscosity of 180 $mm^2/s$ (centistoke) at 25° C.

Component (B)—The Cyclic Organohydrogensilicon Crosslinking Compound

The cyclic hydrogen functional siloxanes and methods of making the compounds are described in detail WO 03/093369 referred to previously. The compounds used as Component (B) included:

(i) XLA—a cyclic hydrogen functional siloxane containing glycidyl ether side chains and having an SiH content of 0.3 percent H.

Component (B1)—The Linear or Branched Acyclic Organohydrogensilicon Crosslinking Compound The compounds used as Component (B1) were linear organohydrogensilicon compounds including:

(i) XLB—a polyorganohydrogensiloxane linear homopolymer containing 1.6 percent SiH and having a viscosity of 30 mm$^2$/s (centistoke) at 25° C.
(ii) XLC—a polyorganohydrogensiloxane linear homopolymer containing 1.5 percent SiH and having a viscosity of 10 mm$^2$/s (centistoke) at 25° C.
(iii) XLD—a dimethylsiloxy, methylhydrogen siloxy copolymer containing 0.9 percent SiH and having a viscosity of 85 mm$^2$/s (centistoke) at 25° C.

Component (B')—Blends of (B) and (B1).
(i) XLE—a 1:1 blend of XLA and XLB.
(ii) XLF—a 1:1 blend of XLA and XLC.
(iii) XLG—a 3:1 blend of XLA and XLD.
(iv) XLH—a 3:7 blend of XLA and XLB.

Component (C)—The Platinum Group Metal-Containing Catalyst

Component (C) was platinum complexed with an alkenylated polydiorganosiloxane.
Component (D)—The Inhibitor
Component (D) was diallyl maleate.
Example—Procedure
Each release coating composition was applied on a Tervasaari Honey glassine paper manufactured by UPM-Kymmene, Helsinki, Finland, or Rhinelander HPL02 SCK paper manufactured by Wausau-Mosinee Paper Corporation, Rhinelander, Wis., using a blade coater. Each silicone release coating composition contained Components (A), (B) and/or (B1). The polymer (A) and crosslinker (B) or (B1) were combined with the platinum catalyst (C). The formulation also contained diallyl maleate as inhibitor (D).

The cure characteristics of the release coatings were assessed by measuring the percentage of extractables in the release coating after curing. This was carried out by first determining the coating weight of a standard sized sample of a substrate with a cured coating, by x-ray fluorescence using a Model Lab X 3000 X-ray fluorescence spectrometer from Oxford Instruments PLC, Oxon, United Kingdom. The coated sample was then placed in a solvent solution of methyl isobutyl ketone to extract any unreacted siloxane which had not been cross-linked into the coating matrix, or adhered to the substrate. After a predetermined period of time, the sample was removed from the solvent, dried, and reweighed. Rub-Off Resistance (ROR) was measured mechanically using a standard commercially available abrasion resistance tester designed to test the washability, brushability, and abrasion resistance of a wide range of materials, including paint, lacquer, inks, and coatings. The resistance to abrasion is expressed as the percentage of the coating remaining on the substrate after the test.

Release performance tests were performed by delamination at 0.3-300 m/minute of laminated papers that had been aged for at least one week. Delamination was determined using either a Model ZPE-1000 High Rate Peel Tester from Instrumentors Inc., Strongsville, Ohio, or a Model LRX Low Peel Rate Tester from Lloyd Instruments Inc., Lloyd, Canada, at a variety of speeds. The results for delamination at 300 m/minute are shown in the Tables. It is can be seen that lower release forces at high speed was achieved using release coating compositions containing cyclic Component (B) and acyclic Component (B1), compared to release coating compositions containing only the cyclic Component (B), i.e., see Tables 1-4. The cure was not compromised by using mixtures of Components (B) and (B1), and the anchorage was improved over the use of only Component (B1), particularly when aged under elevated heat and humidity conditions, i.e., Tables 1-4. Generally, Tables 1-4 show the performance advantages of blends (B') according to the invention, i.e., that they consistently provide better anchorage stability, provide faster cure, and provide lower release force at high peel speeds, than the cyclic component alone.

TABLE 1

Impact of Blending XLA and XLB on Cure Speed, Anchorage Stability, and Release Forces at High Peel Speeds. All Coatings Formulated with Polymer A with an SiH:Vinyl Ratio of 1.6:1, Diallyl Maleate as Inhibitor, and 100 ppm Platinum Catalyst. Coatings were Cured at 110° C. for 4 Seconds. Laminates used for Anchorage Stability were Prepared using Wet-Cast V210 Tackified Acrylic Emulsion Adhesive.

| Crosslinking Composition | Cure Speed % Extractables, 110° C., 4 sec | Tervasaari Glassine Anchorage Stability, Laminate Aged 4 Days at 55° C., 55% RH | V210 Tackified Acrylic Emulsion, Release Force (cN/25 mm) at 300 m/min, 13 Day Laminate Age |
|---|---|---|---|
| XLB | 12 | 95 | 25 |
| XLE | 5 | 98 | 26 |
| XLA | 2 | 64 | 34 |

Table 1 shows that blend XLE provides better over all performance than only XLA or XLB.

TABLE 2

Impact of Blending XLA and XLC on Cure Speed, Anchorage Stability, and Release Forces at High Peel Speeds. All Coatings Formulated with Polymer A with an SiH:Vinyl Ratio of 1.6:1, Diallyl Maleate as Inhibitor, and 100 ppm Platinum Catalyst. Coatings were Cured at 110° C. for 4 Seconds. Laminates used for Anchorage Stability were Prepared using Wet-Cast V210 Tackified Acrylic Emulsion Adhesive.

| Crosslinking Composition | Cure Speed, % Exractables, 110° C., 4 sec | Rhinelander HPL02 SCK Anchorage Stability, Laminate Aged 4 Days at 55° C., 55 RH | V210 Tackified Acrylic Emulsion, Release Force (cN/25 mm) at 300 m/min, 13 Day Laminate Age |
|---|---|---|---|
| XLC | 11 | 76 | 30 |
| XLF | 4 | 86 | 27 |
| XLA | 2 | 80 | 34 |

Table 2 shows that blend XLF provides better over all performance than only XLA or XLB.

TABLE 3

Impact of Blending XLA and XLD on Cure Speed, Anchorage Stability, and Release Forces at High Peel Speeds. All Coatings Formulated with Polymer A with an SiH:Vinyl Ratio of 1.6:1, Diallyl Maleate as Inhibitor, and 100 ppm Platinum Catalyst. Coatings were Cured at 110° C. for 4 Seconds. Laminates used for Anchorage Stability were Prepared using Wet-Cast V210 Tackified Acrylic Emulsion Adhesive.

| Crosslinking Composition | Cure Speed, % Extractables (110° C., 4 sec) | Tervasaari Glassine Anchorage Stability, Laminate Aged 4 Days at 55° C., 55% RH | V210 Tackified Acrylic Emulsion, Release Force (cN/25 mm) at 300 m/min, 13 Day Laminate Age |
|---|---|---|---|
| XLD | 3 | 34 | 25 |
| XLG | 1 | 83 | 32 |
| XLA | 2 | 64 | 34 |

Table 3 shows that blend XLG provides better over all performance than only XLA or XLD.

TABLE 4

Impact of Blending XLA and XLB on Cure Speed, Anchorage Stability, and Release Forces at High Peel Speeds. All Coatings Formulated with Polymer B with an SiH:Vinyl Ratio of 1.6:1, Diallyl Maleate as Inhibitor, and 100 ppm Platinum Catalyst. Coatings were Cured at 110° C. for 4 Seconds. Laminates used for Anchorage Stability were Prepared using Wet-Cast V210 Tackified Acrylic Emulsion Adhesive.

| Crosslinking Composition | Cure Speed, % Extractables (110° C., 6 sec) | Rhinelander HPL02 SCK Anchorage Stability, Laminate Aged 1 Day at 55° C., 55% RH | V210 Tackified Acrylic Emulsion, Release Force (cN/25 mm) at 300 m/min, 13 Day Laminate Age |
|---|---|---|---|
| XLB | 4 | 31 | 25 |
| XLH | 3 | 83 | 27 |
| XLA | 2 | 12 | 44 |

Table 4 shows that blend XLH provides better over all performance than only XLA or XLB.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A composition comprising:
   (A) a compound having at least one aliphatic unsaturation;
   (B) a cyclic organohydrogensilicon crosslinking compound containing at least one silicon-bonded hydrogen atom (SiH) per molecule, prepared by a platinum catalyzed coupling reaction of a methylhydrogen cyclosiloxane, with a reactant containing aliphatic unsaturation, hydroxy functionalities, or a mixture of both, wherein 5-70 percent of the SiH bonds in the cyclic organohydrogensilicon crosslinking compound are replaced or converted to functional groups by adding to the coupling reaction at least one functional compound selected from the group consisting of allylglycidyl ether, vinylcyclohexylepoxide, and compounds containing propargyloxy and hexynyloxy groups; and
   (B1) a linear organohydrogensilicon crosslinking compound containing at least one silicon-bonded hydrogen atom per molecule.

2. A composition according to claim 1 wherein the functional compound is allylglycidyl ether, or vinylcyclohexylepoxide.

3. A composition according to claim 2 wherein the cyclic organohydrogensilicon crosslinking compound has the structure:

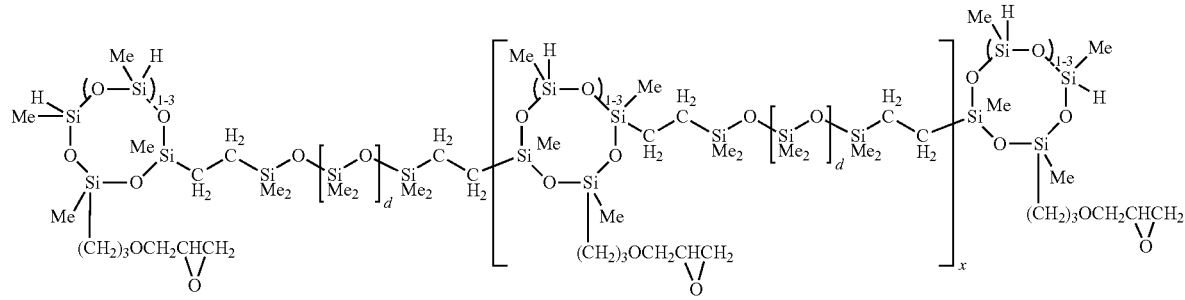

and where 10-25 percent of the SiH groups has been replaced with propylglycidylether groups, x is 1-5, d is about 8, and Me is methyl.

4. A release coating composition comprising:
(A) a compound having at least one aliphatic unsaturation;
(B) a cyclic organohydrogensilicon crosslinking compound containing at least one silicon-bonded hydrogen atom (SiH) per molecule, prepared by a platinum catalyzed coupling reaction of a methylhydrogen cyclosiloxane, with a reactant containing aliphatic unsaturation, hydroxy functionalities, or a mixture of both;
wherein 5-70 percent of the SiH bonds in the cyclic organohydrogensilicon crosslinking compound are replaced or converted to functional groups by adding to the coupling reaction at least one functional compound selected from the group consisting of allylglycidyl ether, vinylcyclohexylepoxide, and compounds containing propargyloxy and hexynyloxy groups;
(B1) a linear organohydrogensilicon crosslinking compound containing at least one silicon-bonded hydrogen atom per molecule; and
(C) a platinum group metal-containing catalyst.

5. A release coating composition according to claim 4 wherein the functional compound is allylglycidyl ether or vinylcyclohexylepoxide.

6. A release coating composition according to claim 5 wherein the cyclic organohydrogensilicon crosslinking compound has the structure:

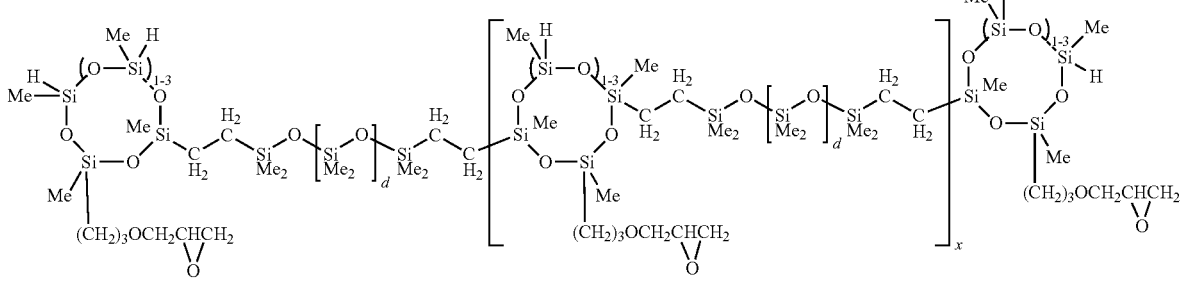

and where 10-25 percent of the SiH groups has been replaced with propylglycidylether groups, x is 1-5, d is about 8, and Me is methyl.

7. A release coating composition according to claim 4 wherein the composition further comprises one or more components selected from the group consisting of an inhibitor, a bath life extender, a release modifier, and a solvent.

* * * * *